United States Patent [19]

Noguchi et al.

[11] Patent Number: 4,494,195
[45] Date of Patent: Jan. 15, 1985

[54] MICROINSTRUCTION CONTROLLED DATA PROCESSOR

[75] Inventors: Kouki Noguchi; Takashi Tsunehiro, both of Kokubunji; Hideo Nakamura, Nishitama, all of Japan

[73] Assignee: Hitachi, Ltd., Tokyo, Japan

[21] Appl. No.: 444,711

[22] Filed: Nov. 26, 1982

[30] Foreign Application Priority Data

Dec. 2, 1981 [JP] Japan ............................ 56-192933

[51] Int. Cl.³ .............................................. G06F 9/26
[52] U.S. Cl. .................................................. 364/200
[58] Field of Search ........................ 364/200 MS File

[56] References Cited

U.S. PATENT DOCUMENTS 4,338,661  7/1982  Tredennick et al. ............... 364/200

Primary Examiner—Raulfe B. Zache
Attorney, Agent, or Firm—Antonelli, Terry & Wands

[57] ABSTRACT

Herein disclosed is a microinstruction controlled data processor in which a microinstruction memory (i.e., an ROM) is driven in each predetermined cycle thereby to generate a plurality of microinstructions in accordance with a page address it receives and in which a general microinstruction contains the page address and the displacement address of the plural preceding microinstructions. One of the plural instructions read out of the ROM is selected upon each read-out operation. The page and displacement addresses in the microinstruction thus selected are set in an address register at the timings for reading out the plural microinstructions. Moreover, a displacement address generator for selecting the plural microinstructions read out of the ROM generates the displacement addresses which are different in dependence upon whether a branch instruction exists in the instructions selected during the same number of cycles as that of the plurality or not and whether the branching operation succeeds or not in case the branch instruction exists.

4 Claims, 8 Drawing Figures

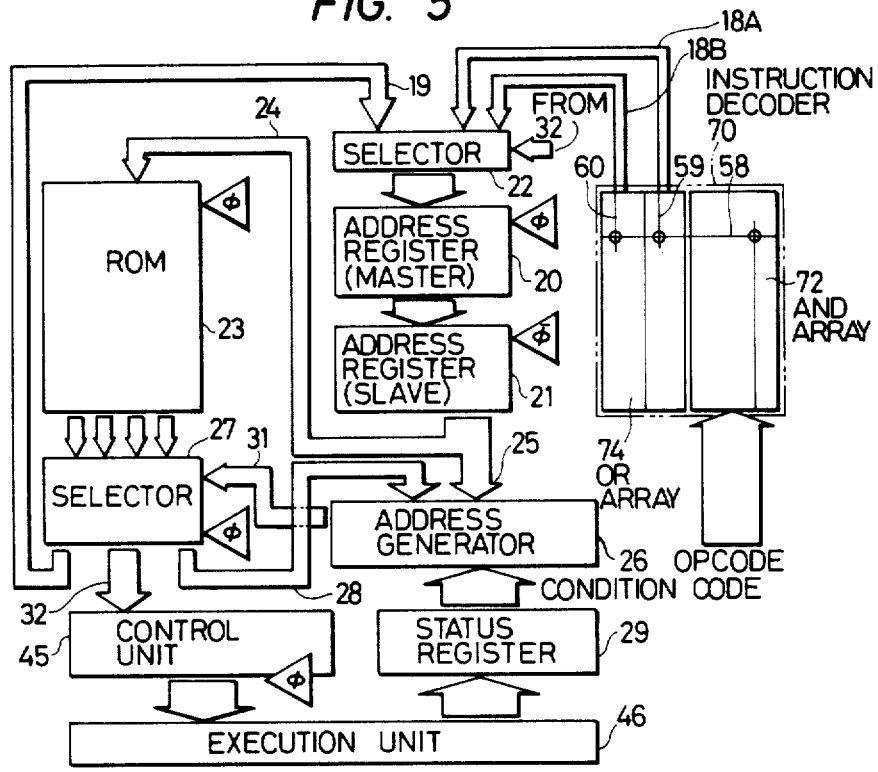

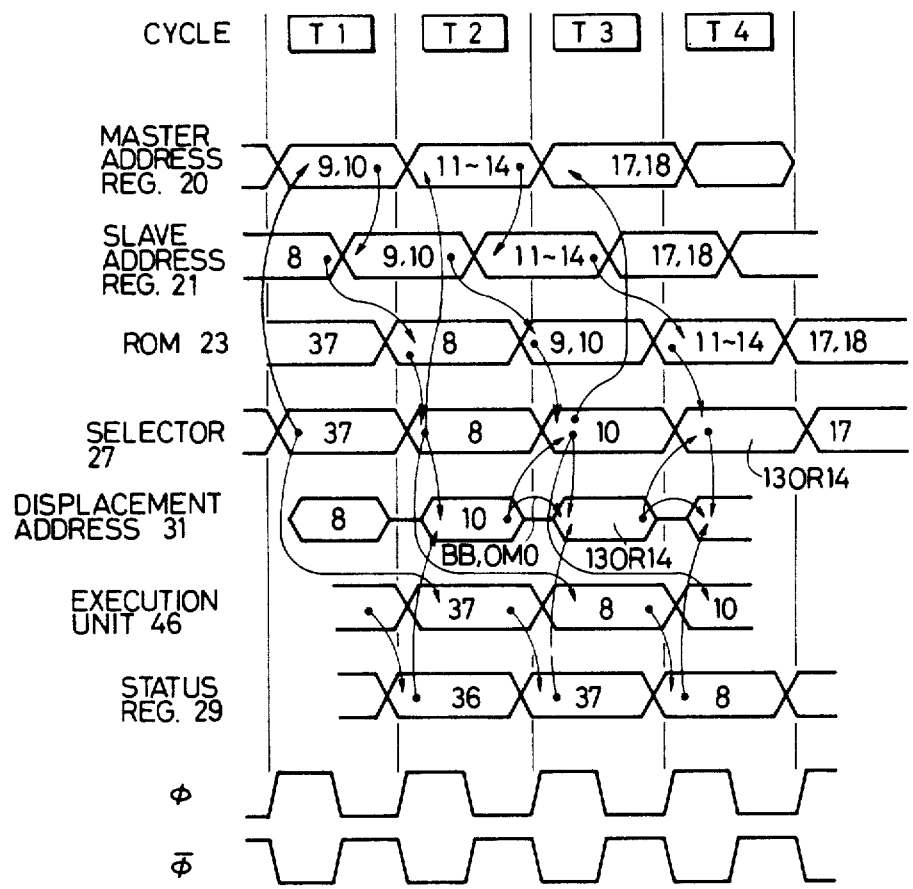

MICROINSTRUCTION CONTROLLED DATA PROCESSOR

BACKGROUND OF THE INVENTION

1. Field of the Invention

The present invention relates to a microinstruction controlled data processor for generating the addresses of microinstructions by using the information in the microinstruction which has been previously read out.

2. Description of the Prior Art

As a method for assigning the addresses of microinstructions to be read out, there exists a method by which the addresses are assigned in accordance with the information in the immediately preceding microinstructions. In accordance with this method, a branch-on-condition instruction 2 read out assigns the page addresses of microinstructions 3 and 4 in case such a microinstruction as is shown in FIG. 1 is to be read out. The microinstructions 3 and 4 are simultaneously read out by that page address, and at the same time the displacement address is generated in accordance with the branch condition, which is assigned by the microinstruction 2, so that one of the microinstructions 3 and 4 read out is selected by that displacement address. The shifts from the branch-on-condition instructions 3 and 4 to other microinstructions 5, 6 and 7 are similarly executed. According to the method thus practised, therefore, serial branch-on-condition instructions can also be executed. Since, however, the address written in the microinstruction read out has to be used to read out the subsequent microinstruction, one machine cycle has to be considerably elongated more than the cycle period of a microinstruction memory.

SUMMARY OF THE INVENTION

It is, therefore, an object of the present invention to provide a data processor which is enabled to sequentially read out microinstructions in a machine cycle near the cycle time of a microinstruction memory.

In a microinstruction controlled data processor according to the present invention, a microinstruction memory (i.e., an ROM) is driven in each predetermined cycle thereby to generate a plurality of microinstructions in accordance with a page address it receives, and a general microinstruction contains the page address and the displacement address of the plural preceding microinstructions. One of the plural instructions read out of the ROM is selected upon each read-out operation. The page and displacement addresses in the microinstruction thus selected are set in an address register at the timings for reading out the plural microinstructions. Moreover, a displacement address generator for selecting the plural microinstructions read out of the ROM generates the displacement addresses which are different in dependence upon whether a branch instruction exists in the instructions selected during the same number of cycles as that of the plurality or not and whether the branching operation succeeds or not in case the branch instruction exists.

BRIEF DESCRIPTION OF THE DRAWINGS

FIG. 5 is a block diagram schematically showing the embodiment of the present invention;

FIG. 6 is a table illustrating how to generate a displacement address to be used in the embodiment of FIG. 5;

FIG. 8 is a time chart of the circuit of FIG. 5.

DESCRIPTION OF THE PREFERRED EMBODIMENT

The microinstruction controlled data processor according to the present invention is shown in the block diagram of FIG. 5.

Figure 3:
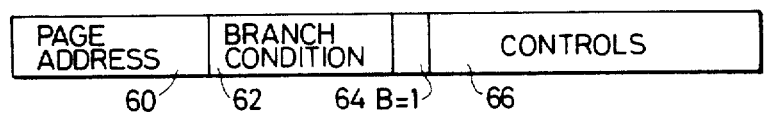
FIG. 3 is a format showing a branch-on-condition instruction to be used in one embodiment of the present invention.
Figure 4:
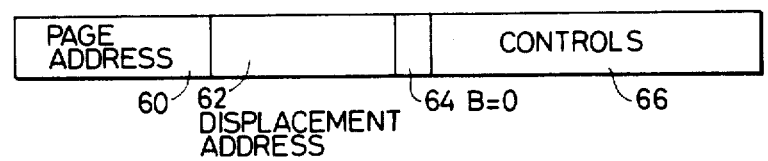
FIG. 4 is a format showing a general branch instruction to be used in the embodiment of the present invention.

FIG. 3 is a format of a branch-on-condition microinstruction, which is constructed of a microinstruction page address field 60, a branch condition field 62, a B-bit field 64 having a value of 1 indicating of the branch-on-condition instruction, and a control signal field 66 for controlling an execution unit. FIG. 4 is a format of a general instruction other than the branch-on-condition instruction and is different from FIG. 3 in that the field 62 contains the displacement address of the microinstruction and in that the B-bit field 64 contains a value of 0.

In the present embodiment, the page or displacement address owned by each microinstruction is that of the second one before each microinstruction.

In FIG. 5, an ROM 23 is so constructed of four banks for storing the microinstructions that it reads out one microinstruction from each bank on the basis of a page address 24 it receives. A selector 27 selects one of those four microinstructions thus read out in accordance with a displacement address 31 it receives. For this operation, the displacement address is composed of two bits. The data processor of FIG. 5 further includes: an execution unit 46; a control unit 45 for decoding the output 32 of the selector 27 to control the execution unit 46; a status register 29 for storing the condition code which is generated on the basis of the execution result by the execution unit 46; a selector 22 for selecting a plurality of address inputs; address registers 20 and 21; and a displacement address generator 26.

The data processor of FIG. 5 is controlled by the clocks ∅ and ∅ shown in FIG. 8. The latter clock 519 takes a high level a half machine cycle after the former block ∅.

The selector 22 is made to receive signals 18A, 18B and 19 as its inputs. The signals 18A and 18B are given by an instruction decoder 70. More specically, the instruction decoder 70 decodes the OPCODE in the machine instruction to be executed and generates the addresses (i.e., the page address and the displacement address) 18A and 18B of the first and second microinstructions of a microprogram corresponding to that machine instruction. The execution decoder 70 is constructed of an AND array 72 and an OR array 74. The OPCODE thus received raises only one line 58 of the plural output lines of the AND array 72 to an "H" level. In the OR array 74, the page and displacement addresses of the aforementioned two microinstructions, which are written in advance on the line 58, are read out to output lines 59 and 60.

The signal 19 is composed of the fields 60 and 62 of the microinstructions selected by the selector 27. As a result, the signal 19 is composed of the page and displacement addresses of the second one before the microinstruction, when the microinstruction selected is a general one, and is composed of the page address of the second one before the microinstruction and the branch condition when the microinstruction selected is a branch-on-condition instruction. Thus, that signal 19 may be shortly referred to as an "address" in the following irrespective of the difference in the content thereof.

The control of the selector 22 is conducted by the control field 66 of the microinstruction selected by the selector 27. The control field 66 of the last but one and the last microsinstructions and other microinstructions of the microprogram contains the information (although not shown) for designating the respective selections of the addresses 18A, 18B and 19, and that information is fed through the line 32 to the selector 22. As a result, this selector 22 conducts the selection of the address 18A of the leading microinstruction of the microprogram to be next executed, when the last but one microinstruction of the microprogram being executed is read out, and the selection of the address 18B of the second microinstruction in the next cycle, and continues the selection of the address 19 in the subsequent cycles.

The addresses thus selected by the selector 22 are set in the master address register 22 in synchronism with the clock $\emptyset$ and are then shifted to the slave address register 21 in synchronism with the clock $\emptyset$. The page address in the slave address register 21 is fed through the line 24 to the ROM 23, which is driven in synchronism with the clock $\emptyset$, so that the four microinstructions having the page addresses existing in the register 21 are read out during the driving operation. On the other hand, the displacement address in the register 21 is fed through a line 25 to the address generator 26 so that it is used for the generation of the displacement address together with the fields 62 and 64 which are fed through a line 28 to the selector 27. One of the four microinstructions, which are read out of the ROM 23 on the basis of the displacement address thus generated, is selected by the selector 27. The control unit 45 decodes the selected microinstruction thereby to instruct the execution unit 46 to conduct its execution. Then, this execution unit 46 conducts its instructed execution thereby to write the result in a not-shown memory or the like and to decodes a condition code, if necessary, in accordance with the kind and result of the execution, until it sets the decoded condition code in the status register 29. The address generator 26 judges the branching operation, when the instruction being actually generated by the selector 27 is the branch-on-condition instruction, on the basis of that condition code thereby to generate the displacement addresses which are different in accordance with that judgement result.

Figure 1:
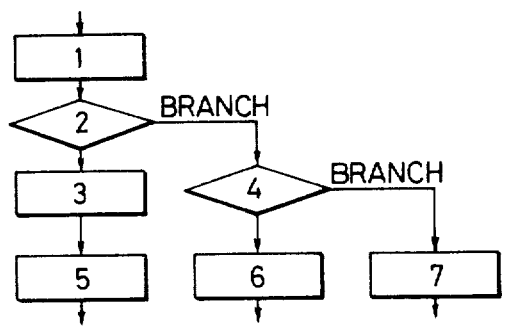
FIGS. 1 and 2 are charts showing different flows of microinstructions containing branch-on-condition instructions.
Figure 2:
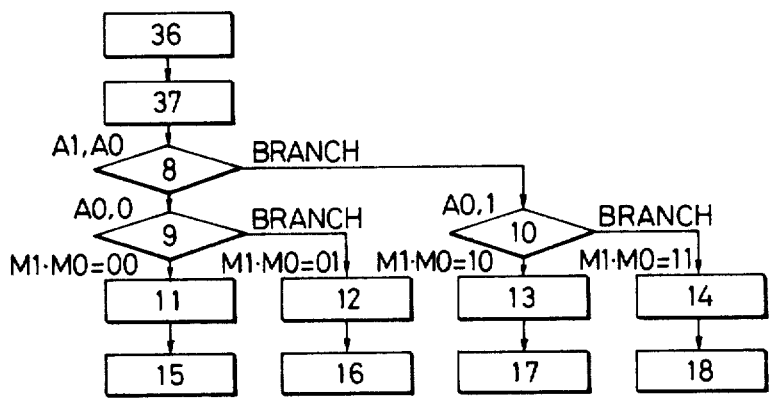

The operations of the data processor of FIG. 5 will be described in more detail in connection with the flow of the microinstructions of FIG. 2 with refference to the time chart of FIG. 8. In FIG. 2, microinstructions 8 to 10 are branch-on-condition instructions, and the remainder is a general instruction.

In the present embodiment, plural groups of instructions, which may possibly be read out in an identical cycle, e.g., the instructions 9 and 10, 11 to 14, 15 and 16, or 17 and 18 are respectively assigned at identical page addresses.

In FIG. 2, one of the instructions 11 to 14 is selectively executed in accordance with the results of the branch judgements of the branch-on-condition instruction 8 and the branch-on-condition 9 or 10. It is, therefore, necessary to determine the displacement address, which is to be used for selecting one of the four instructions read out on the basis of the page address assigned at the branch-on-condition instruction 8, on the basis of those two branch judgement results.

For this necessity, in the present embodiment, the generations of displacement addresses M1 and M0 are conducted in accordance with the Table of FIG. 6. Here, letter B indicates a B-bit in the instruction which is generated by the selector 27 at present, i.e., at the time for the processing operation, and letters BB indicate a B-bit in that preceding the instruction. Moreover, letters $\overline{OMO}$ indicate the lower bit of the displacement address which is generated for selecting the instruction having already been read at present out of the selector 27. At last, that bit $\overline{OMO}$ is assigned to the lower bit of the displacement address of the instruction which is being read at present out of the selector 27. Still moreover, letters PM1 and PM0 respectively indicate the higher bit and the lower bit of the displacement address, which is assigned by that preceding the instruction being read at present out of the selector 27, in case that preceding instruction is a general one. Those bits are stored in the slave address register 21.

More specifically, when the instruction being read at present out of the selector 27 is the general one as an instruction 37 and when a preceding instruction 36 is also the general one (i.e., B=BB=0), the displacement addresses PM1 and PM0 assigned by the preceding instruction 36 are generated, as they are, as the displacement addresses M1 and M0 for selecting the subsequent instruction 8. When the present instruction is the branch-on-condition one as the instruction 8 (B=1), on the contrary, a predetermined one of the displacement addresses M1 and M0, e.g., the address M0 is made different in accordance with the branch judgement result. In the present embodiment, the displacement address M0 is respectively set at 1 and 0 in accordance with whether the branching operation succeeds or not. The bit M1 may be set at an arbitrary value, because the instruction 37 preceding the instruction 8 is not the branch one, but is set at the lower bit OM0 of the displacement address of the instruction for the following reasoning. More specically, when the instruction being read at present out of the selector 27 is the branch one as the instruction 9 or 10 and when the preceding instruction 8 is also the branch one, one of the four instructions 11 to 14, which are read out on the basis of the page address assigned by the instruction 8, has to be determined on the basis of not only the branch judgement result at the branch instruction 9 or 10 but also the branch judgement result at the branch instruction 8. In order to discriminate the subsequent instruction 11 or 12 in accordance with the branch judgement result at the instruction 9, it is sufficient to set the lower bits M0 of the displacement addresses of the subsequent instructions 11 and 12 at 0 and 1, respectively, as has already been described in connection with the instruction 8. It is likewise sufficient to set the lower bits M0 of the instructions 13 and 14 at 0 and 1, respectively. In order to discriminate the instructions 11 and 12 from the instructions 13 and 14 in accordance with the branch judgement result at the branch instruction 8, moreover, it is sufficient to discriminate the upper bits M1 of the displacement addresses of the instructions 11 and 12 from the upper bits M1 of the instructions 13 and 14. In other words, it is sufficient to determine the upper bits M1 of the instructions 11 to 14 dependence upon the branch judgement result at the instruction 8. Since, however, the lower bits OM0 of the displacement addresses of the instructions 9 and 10 are respectively set at 0 and 1 in the present embodiment, as has been described in the above, it is apparently sufficient to use the lower bit OM0 of the displacement address of the preceding instruction 9 or 10, as it is, as the upper bits M1 of the displacement addresses of the instructions 11 and 12, and 13 and 14, respectively. Therefore, when the instruction read at present out of the selector 27 is the branch one, the displacement address of the subsequent instruction may be determined in such a manner as has already been discribed in the case of the instruction 8. Then, the displacement address of the subsequent instruction 11 or 12 can be determined absoltely similarly even when the branch instruction 9 subsequent to the branch instruction 8 is being read at present out of the selector 27.

After all, it is sufficient that the displacement addresses of the instructions 11 to 14 be set at 00, 01, 10 and 11, respectively. Like the instructions 15 and 16, moreover, when the instruction 11 or 12 being read at present out of the selector 27 is the general one (B=0) and when the preceding instruction 9 is the branch-on-condition one (BB=1), it is necessary to generate the displacement address for the instruction 15 or 16 in accordance with the branch judgement result of the instruction 9. This judgement result is reflected upon the lower bit OM0 of the displacement address which has been generated for selecting the instruction 11 or 12. In the case of B=0 and BB=1, therefore, it is sufficient to set one of the bits M1 and M2 to be generated at the bit OM0 which has been generated for selecting their preceding instruction. The other bit M1 or M2 may be arbitrary. Here, the bit M1 is set at the bit OM0 similarly to the case of B=1, and the bit M2 is set at 0. Although the detail of the generator 26 under consideration will be described hereinafter, the B-bit BB of that preceding the instruction, which is being read at present out of the selector, is stored, and the lower bit OM0 of the displacement address, which is generated for selecting that preceding instruction, is stored so that the displacement addresses M1 and M0 of the subsequent microinstruction are generated in accordance with the Table of FIG. 6 on the basis of the B-bit of the instruction being read at present out of the selector 27, the branching condition existing in the field 62, the condition code in the status register 29, and the displacement addresses PM0 and PM1 existing in the slave address register 21.

Now, it is assumed that the microinstruction 37 is read out of the ROM 23 before a cycle T1 and that the selector 27 selects that microinstruction 37 in the cycle T1 in response to the clock ∅. The selector 27 is so constructed as to hold the selected output until the subsequent input time of the clock ∅. The instruction 37 is decoded by the control unit 45 in synchronism with the clock ∅ of a subsequent cycle T2, and the execution unit 46 conducts its execution to determine the condition code in accordance with the kind and result of the execution thereby to set that condition code in the status register 29 at the end of the cycle T2.

In parallel with the processing operation of the instruction 37 thus far described, the page address and the displacement address in the instruction 37 are selected by the selector 22 and are set in the master address register 20 in synchronism with the clock ∅ of the cycle T1. The present invention is so constructed that each microinstruction is assigned by the address of the last but one preceding microinstruction. As a result, the instruction 37 assigns the address of either the instruction 9 or 10. Of those addresses, however, the displacement address is not used for selecting the instruction 9 or 10, as will be detailed hereinafter.

In this meanwhile, the slave address register 21 has already been set in the cycle T1 with the address of the instruction to be executed subsequently to the instruction 37. This address is assigned by the general instruction 36 preceding the instruction 37.

On the basis of the page address of the instruction 8 in the slave address register 21, the ROM 23 starts its read-out operation in synchronism with the clock ∅ of the cycle T1. Thus, the four instructions including the instruction 8 are read out after the lapse of the access time of the ROM 23. In the present embodiment, it is assumed that the instruction 8 is read out slightly before the end of the cycle T1. If the instruction 37 is the general one (B=0) and if the preceding instruction 36 is also the general one (BB=0), on the other hand, the address generator 26 feeds the displacement address for the instruction 8, which is given from the register 21, as it is, to the selector 27 in the cycle T1. Thus, the selector 27 selects the microinstruction 8 in response to the clock ∅ of the subsequent cycle T2. That instruction 8 is executed similarly to the instruction 37 in a subsequent cycle T3, and the condition code is written, if necessary, at the end of the cycle T3.

In parallel with the read-out operation of the instruction 8 from the ROM 23, on the other hand, the slave address register 21 is set with the content (the address or the instruction 9 or 10 in the present example) of the master address register 20 at that time in synchronism with the clock ∅ of the cycle T1. That address is used for the read-out operation at the ROM 23 in synchronism with the clock ∅ of the subsequent cycle T2. As a result, the four microinstructions including the instructions 9 and 10 are read out approximately at the end of the cycle T2. In parallel with the read-out operations thus far described, the address generator 26 generates the displacement address, which is used to select the instruction 9 or 10, in the cycle T2. Since the B-bit of the instruction 8, which has already been generated in the cycle T2 by the selector 27, takes the value of 1, the address generator 26 detects whether the branch succeeds or not in synchronism with the clock ∅ of the cycle T2 on the basis of both the condition code in the status register 29 at that time and the branching condition in the field 62, which is received thereby through the line 28, thereby to generate the displacement address of the instruction 9 or 10 in accordance with the detection result. If the upper and lower bits of the displacement address of the instruction 8 are indicated at A1 and A0, the generator 26 generates the bits A0, 0, A0 and 1 as the displacement addresses M1 and M0, respectively, when the branch succeeds or not. As is quite natural, therefore, those displacement addresses have to be assigned to the instructions 9 and 10. On these displacement addresses thus generated, the selector 27 selects the instruction 9 or 10 in response to the clock ∅ of the cycle T3. Here, it is assumed that the instruction 10 is selected. Incidentally, the condition code used for detecting whether the branch of the instruction 8 succeeds or not is written in the status register 29 in the cycle T1 so that it depends upon the execution result of the instruction 36 preceding the instruction 37. On the basis of the execution reguls of the last but one preceding or more previous one of the instruction 8, therefore, it is detected whether the branch succeeds or not. However, this raises no practical problem. Incidentally, the reference letters appearing over the lefthand shoulders of the blocks of FIG. 2 indicate the displacement addresses of the respective instructions.

In parallel with the read-out operations of the branch instructions 9 and 10, the page address in the branch instruction 8, which has been selected before the former instructions, is set in the master address register 20 through the selector 22 in synchronism with the clock $\emptyset$ of the cycle T2. That page address thus set is one which is common among the instructions 11 to 14 secondly subsequent to the instruction 8. Those data are set in the slave address register 21 in synchronism with the clock $\emptyset$ of the cycle T2 so that the instructions 11 to 14 are read out of the ROM 23 approximately at the end of the cycle T3. In this meanwhile, the address generator 26 generates the displacement address for one of those four instructions in parallel with the aforementioned read-out operation.

More specifically, since the B-bit of the instruction 10 fed from the selector 27 through the line 28 takes the value 1, whether the branch succeeds or not is judged in accordance with both the branch condition of the instruction 10 fed through the lile 28 and the condition code in the status register 29. The displacement addresses 1 and 0 are generated, if the branch fails, by using the lower bit 1 of the displacement address (e.g., the bits A0 and 1 in this case), which is generated for selecting the instruction 10, as the higher bit M1 and the value 0 as the lower bit M0. Thus, the displacement address for the instruction 14 is generated. If the branch fails, on the contrary, the displacement address for the instruction 13, which is composed of the bits M1 = 1 and M0 = 1, is generated. Thus, the selector 27 is enabled to select the instruction 13 or 14 is synchronism with the clock $\emptyset$ of a cycle T4. Now, let it be assumed that the instruction 13 is selected. At this time, the four instructions including the instructions 17 and 18 are read out of the ROM 23 at the end of the cycle T3 on the basis of the page address assigned by the instruction 10. Then, the address generator 26 has to generate the displacement address of the instruction 17. This generation is conducted in the following manner in accordance with the Table of FIG. 6. Specifically, since the B-bit of the instruction 13 being read out of the selector 27 at present in the cycle T4 takes the value 0 whereas the B-bit (BB) of the preceding instruction 10 takes the value 1, the generator 26 generates the addresses 0 and 0, which use the lower bit 0 of the displacement addresses 1 and 0 of the instruction 13 as the higher bit M1 and the value 0 as the lower bit. If the result of the branch judgement of the instruction 10 reveals the branch success so that the instruction 14 is selected, the generator 26 generates the values 1 and 0 as the displacement addresses. Of the four instructions including the instructions 17 and 18, therefore, the instruction to be subsequently executed can be assigned in accordance with the branch judgement result of the branch instruction 10.

Even in case the on-condition instructions are serial, there can be applied in the manners thus far described the method by which the microinstruction to be subsequently read out is assigned in accordance with that preceding the instruction being read at present out of the selector 27.

Incidentally, as is apparent from the description thus far made, the ROM 23 is driven in snychronism with the clock $\emptyset$ thereby to read out the plural microinstructions after about one cycle. On the other hand, it is not before a half cycle after the microinstruction has been fed from the selector 27 that the page address in that microinstruction is set in the slave address register 21. The ROM 23 is adapted to be driven when the half cycle elapses after the register 21 has been set with a new address. As a result, the instruction, which is assigned by the instruction selected from the selector 27, is actually generated by the selector 27 after two machine cycles. Thus, the microinstruction having the page address, which is assigned by the instruction being selected from the selector 27, is enabled to be read out after the two machine cycles by setting that page address at a suitable timing in the slave address register 21. In the present embodiment, it is assumed that the cycle time of the ROM 23 is equal to the access time. In the present embodiment, moreover, the ROM can be accessed in the machine cycle which has a time duration substantially equal to the cycle time of the ROM 23.

Figure 7:
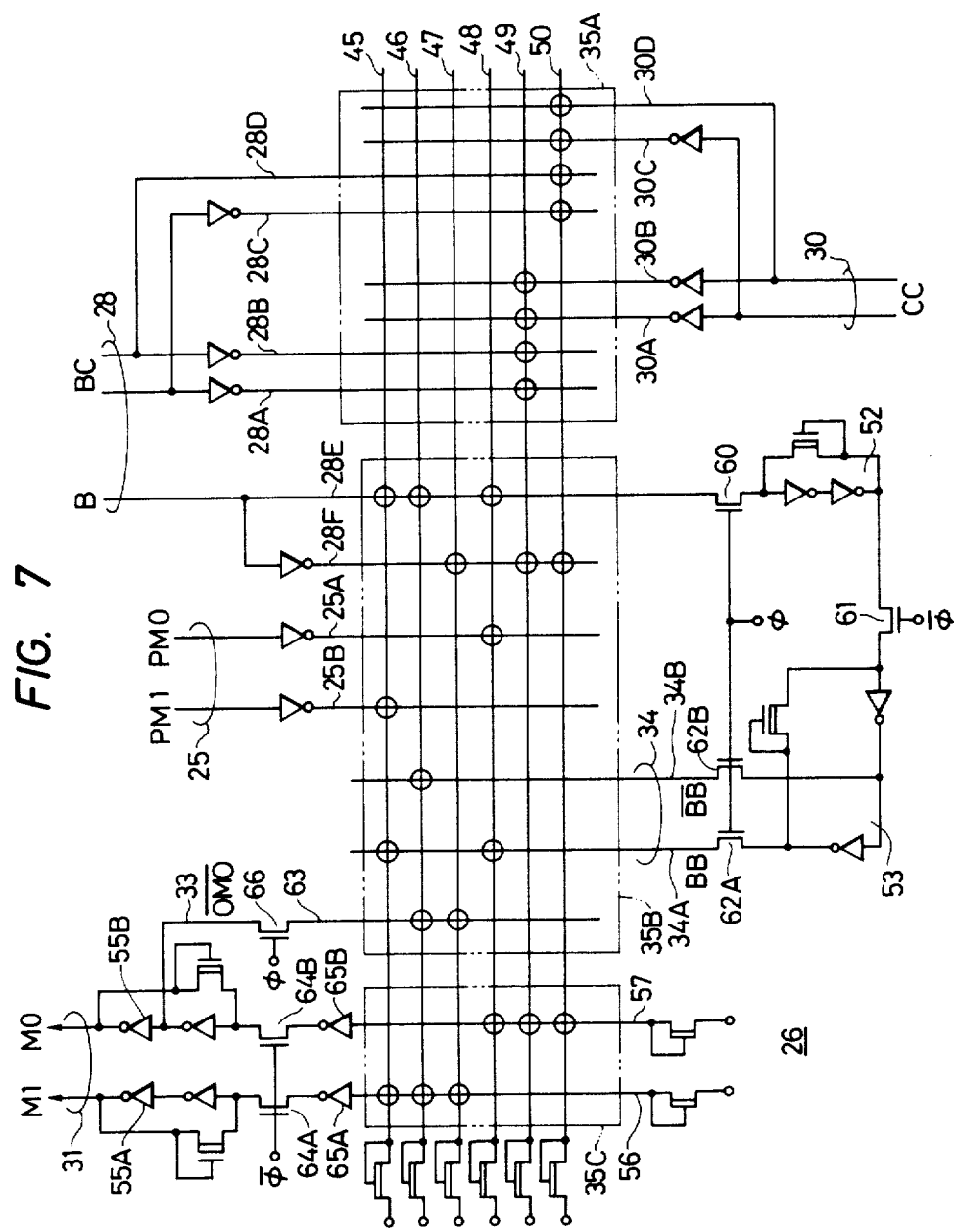
FIG. 7 is a circuit diagram specifically showing an address generator to be used in the embodiment of FIG. 5.

The address generator 26 will be described in the following with reference to FIG. 7. The generator 26 is constructed of a program logic array, which is composed of AND arrays 35A and 35B and an OR array 35C, and input/output circuits for the program logic array. In the respective arrays, circles located at the nodes between the input lines and the output lines indicate switch elements, through which the output lines intersecting a certain input line take a low level when that input line takes a high level. Despite of this fact, the voltage at the output lines intersecting that input line while bypassing those elements are left at the high level.

The AND array 35A is a circuit for holding the level of a predetermined output line 49 or 50 at the high level only when both the signal, which is prepared by suitably inverting a branch condition BC fed through the line 28 from the selector, and the signal, which is prepared by similarly inverting a condition code CC fed through the line 30 from the status register 29, take predetermined values. In FIG. 7, there is shown as one example of the AND array 35A a portion of a circuit which is made operative to detect the coincidence between the branch condition BC of two bits and the condition code CC of two bits. More specifically, the branch condition BC is fed by way of the two inverters from the input lines 28A and 28B to the array 35A, and the switch elements are disposed at the intersections between those input lines 28A and 28B and the output line 49. Likewise, the condition code CC is fed by way of the two inverters and lines 30A and 30B to the array 35A, and the switch elements are disposed at the intersections between those input lines 30A and 30B and the output line 49. As a result, the line 49 takes the high level only when both the branch condition BC and the condition code CC are equal to ")". As a result, the line 49 is left at the high level only when that branch condition is satisfied. Likewise, the line 50 is left at the high level only when the branch condition BC takes the value "10" so that is is satisfied. Thus, the lines 49 and 50 take the high level only when the predetermined respective branch conditions are satisfied. Likewise, it is necessary to provide both output lines, which take the high level only when the branch succeeds for the branch condition BC having another value, and input lines which intersect those output lines, but the output and input lines are not shown for simplicity of illustration.

For simplicity of description, whether the branch holds or not for both the branch condition BC and the condition code having the value "00" is expressed in terms of a synbol BR1 which can take a value 1 or 0. Likewise, whether the branch holds or not for both the branch condition BC and the condition code having the value "01" is expressed in terms of a symbol BR2 which can take the value 1 or 0. As a result, the potentials $S_{49}$ and $S_{50}$ at the lines 49 and 50 are expressed by the following Equations, respectively:

$$S_{49} = BR1 \tag{1}$$

and $$S_{50} = BR2 \tag{2}$$

The AND array 35B is fed with the B-bit, which is given through the line 28 from the selector 27, and its inverted signal $\bar{B}$ by way of input lines 28F and 28E, respectively, and further with the inverted signals of the displacement addresses PM0 and PM1, which are given from the slave address register 21, by way of input lines 25A and 25B, respectively. As has been described hereinbefore, the symbols PM0 and PM1 are used because the displacement address which is contained in that preceding the instruction generated from the selector 27 is stored in the slave address register 21. The array 35B is further fed with both the B-bit BB, which is contained in that preceding the instruction being generated at present by the selector 27, and the inverted signal $\overline{BB}$ of the former. Specifically, circuits 52 and 53 are the well-known latch circuits which are composed of two series-connected inverters and closed-loop forming transistors. The latch 52 is fed with the B-bit B of the instruction, which has already been read out of the selector 27 until the present time and which is fed through the line 28 from the selector 27, by way of the transistor 60 which is rendered conducting in response to the clock $\emptyset$. Since the selector 27 is made operative in synchronism with the clock $\emptyset$, as has been described hereinbefore, the B-bit B of the instruction being generated at present by the selector 27 is latched as it is in the latch 52. The output of this latch 52 is latched again by the latch 53 by way of the transistor 61 which is rendered conducting in response to the clock $\emptyset$. The output of this latch 53 is fed to one 34A of the lines 34 by wat of the transistor 62A which is rendered conducting in response to the clock $\emptyset$. As a result, the signal on the line 34A indicates the B-bit, which has been fed from the line 28 one cycle before, namely, the B-bit BB of that preceding the instruction being read at present out of the selector 27. Incidentally, the other 34B of the lines 34 is fed with such a voltage at the node between the two inverters of the latch 53 as is switched on in response to the clock $\emptyset$. The voltage of that line 34B is equal to the inverted signal $\overline{BB}$ of the signal BB.

The AND array 35B is fed with the inverted signal $\overline{OM0}$ of the lower bit of the displacement address, which has been used for selecting the instruction being generated at present by the selector 27, by way of the transistor 66, which is rendered conducting in response to the clock $\emptyset$, and a line 63.

The levels of the lines 45 to 48 take the high value only when all the voltages of the plutal input lines connected with those lines through the switch elements take the low level. Hence, the logic levels S45 to S48 of the lines 45 to 48 are expressed by the following Equations:

$$S45 = B \cdot BB \cdot PM1 \tag{3}$$

$$S46 = B \cdot BB \cdot OM0 \tag{4}$$

$$S47 = B \cdot OM0 \tag{5}$$

and $$S48 = B \cdot BB \cdot PM0 \tag{6}$$

On the contrary, the lines 49 and 50 take the high level when the inverted signal of the B-bit fed through the line 28F is at the low level and when the result of the branch judgement at the AND array 35A reveals that the branch succeeds. Hence, the levels of the lines 49 and 50 are expressed in the following forms by using the aforementioned symbols BR1 and BR2:

$$S49 = B \cdot BR1 \tag{7}$$

and $$S50 = B \cdot BR2 \tag{8}$$

In the OR relay 35C, an output line 56 is at the low level when one of the lines 45 to 47 takes the high level. Hence, the output OUT1 of the inverter 65A which is connected with the line 56 is expressed by the logic sum of the signals S45 to S47 in the following form:

$$OUT1 = S45 + S46 + S47 \tag{9}$$

Likewise, an output line 57 takes the low level when one of the lines 48 to 50 takes the high level. Hence, the output OUT0 of an inverter 65B is expressed by the logic sum of the signals S48 to S50 in the following form:

$$OUT0 = S48 + S49 + S50 \tag{10}$$

Those outputs OUT1 and OUT0 are latched by latch circuits 55A and 55B by way of the transistors 65A and 65B which are rendered conducting in response to the clock $\emptyset$. As a result, the outputs M1 and M0 of those latch circuits are those which are prepared by delaying the outputs OUT1 and OUT0 a half cycle.

Those outputs M1 and M0 of the latches 55A and 55B are latched until the block $\emptyset$ is fed to transistors 64A and 64B. It is, therefore, understood that the output of the first-stage inverter of the latch 55B corresponds to the inverted signal of the lower bit OM0 of the displacement address which has been used for selecting the instruction being generated at present by the selector 27.

As a result that the generator 26 has the construction thus far described, the signal S47 is equal to the bit OM0 for B=1, and the bit M1 is made equal to the bit OM0 from the Equation (9). In accordance with the Equations (7) and (8), moreover, either the signal S47 or S48 takes the value 1, if the branch succeeds, but both take the value 0, when the branch fails, so that the bit M0 is made to take the value 1 or 0 by the Equation (10) in accordance with whether the branch succeeds or not.

For B=0 and BB=1, still moreover, the signal S46 is made equal to the bit OM0 by the Equation (4) so that the bit M1 becomes equal to the bit OM0 in accordance with the Equation (9). On the other hand, all the remaining signals take the value 0 so that the bit M0 takes the same value 0.

For B=BB=0, furthermore, the signals S45 and S48 are equal to the addresses PM1 and PM0, respectively, in accordance with the Equations (3) and (6) so that the bits M1 and M0 become equal thereto.

As has been described hereinbefore, the generator 26 can generate the displacement addresses M1 and M0, which are used for selecting the subsequent instruction, in accordance with the items tabulated in FIG. 6.

Incidentally, although the respective instructions are assumed in the foregoing embodiment to assign the address of the last but one preceding instruction, the present invention should not be limited to that assumption. Moreover, it is apparent that the present invention can be applied even to the case in which the number of branch exceeds two.

As has been described hereinbefore, according to the present invention, the address of the subsequent microinstruction can be assigned by each microinstruction, and the plural instructions can be sequentially read out in the machine cycle near the cycle time of the microinstruction memory.

What is claimed is:

1. A microinstruction controlled data processor comprising:

an address register;

storage means adapted to be driven in each of predetermined cycles for reading out a predetermined number of microinstructions on the basis of the page address which is stored in said register, a first field of each of said microinstructions containing a page address for addressing the subsequent microinstruction which is to be read out after said predetermined cycles in view of the read-out cycles of the respective microinstructions, a second field of a general instruction other than a branch-on-condition instruction containing a displacement address for addressing said subsequent microinstruction, and a second field of said branch-on-condition instruction containing information for addressing a branch condition;

means for selecting one of the read-out plural microinstructions upon each of said read-out operations;

setting means made synchronous with said selecting operation for setting said register with the first and second fields of said selected instructions with a delay of said predetermined number of cycles from the timing at which the page address for reading out said selected instructions is set in said address register;

means for detecting on the basis of the second field of said selected branch instruction whether the branch addressed by said branch instruction succeeds or not when said selected microinstruction is the branch instruction; and address generating means partly for generating the displacement address for addressing the microinstruction to be selected in a subsequent cycle at each end of said selecting operations and partly for feeding the same to said selecting means, said displacement address being generated by said selecting means on the basis of both the output of said detecting means during said predetermined number of cycles until the time for the processing operation and the displacement address existing in said address reigister at the time for the processing operation.

2. A date processor according to claim 1, wherein said address generating means is made operative to generate as the displacement address for said addressing operation the displacement address, which actually exits in said address register, when no branch instruction exists during said predetermined number of cycles, and the displacement addresses, which are different in dependence upon both such one of said predetermined number of cycles as has a branch instruction and the detected result of the branch success for said branch instruction, when said branch instruction exists during said predetermined number of cycles.

3. A data processor according to claim 1, wherein said predetermined number is two, and wherein said address generating means includes: means for storing the displacement address which is generated in the cycle at the time for the processing operation; means for storing a signal indicating whether the instruction selected in the cycle preceding that at the time for the processing operation is the branch one or not; and means for generating the displacement address existing in said address register at the time for the processing operation, when the instruction selected at the time for the processing operation is not the branch one and when the instruction selected in the cycle preceding that at the time for the processing operation is not the branch one, for generating both a portion of the displacement address generated in the cycle at the time for the processing operation and a displacement address at a predetermined value of 1 or 0, when the instruction selected at the time for the processing operation is not the branch one but when the instruction selected in the cycle preceding that at the time for the processing operation is the branch one, and for generating both a portion of the displacement address generated in the cycle at the time for the processing operation and the displacement address at the value of 0 or 1 which is determined whether the branch succeeds or not, when the instruction selected at the time for the processing operation is the branch one.

4. A data processor according to claim 3, wherein said displacement address is composed of two bits, and wherein said address generating means is made operative to generate the displacement address, which is composed of both a higher bit equal to the lower bit OM0 generated in the cycle at the time for the processing operation and a higher bit having a predetermined value of 0 or 1, when the instruction selected at the time for the processing operation is not the branch instruction but when the instruction selected in the cycle preceding that at the time for the processing operation, and to generate the displacement address, which is composed of both the higher bit equal to the lower bit generated in the cycle at the time for the processing operation and a lower bit having a value of 1 or 0 in accordance with whether the branch succeeds or not, when the instruction selected at the time for the processing operation is the branch one.

* * * * *